(12) United States Patent
Tan et al.

(10) Patent No.: US 11,461,753 B2
(45) Date of Patent: Oct. 4, 2022

(54) AUTOMATIC VENDING METHOD AND APPARATUS, AND COMPUTER-READABLE STORAGE MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Zhiyu Tan, Beijing (CN); Yifeng Zhang, Beijing (CN); Yongjie Wang, Beijing (CN); Yu Chen, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 194 days.

(21) Appl. No.: 16/968,032

(22) PCT Filed: Feb. 14, 2019

(86) PCT No.: PCT/CN2019/075078
§ 371 (c)(1),
(2) Date: Aug. 6, 2020

(87) PCT Pub. No.: WO2019/165892
PCT Pub. Date: Sep. 6, 2019

(65) Prior Publication Data
US 2021/0398096 A1 Dec. 23, 2021

(30) Foreign Application Priority Data
Mar. 2, 2018 (CN) .................. 201810174847.X

(51) Int. Cl.
*G06Q 20/18* (2012.01)
*G07F 9/02* (2006.01)
*G06N 20/00* (2019.01)

(52) U.S. Cl.
CPC .............. *G06Q 20/18* (2013.01); *G06N 20/00* (2019.01); *G07F 9/023* (2013.01)

(58) Field of Classification Search
CPC .... G06Q 20/18; G06Q 20/203; G06Q 20/208; G06N 20/00; G06N 3/0454; G06N 3/08;
(Continued)

(56) References Cited

U.S. PATENT DOCUMENTS 10,157,413 B2 * 12/2018 Landers, Jr. ............ G06T 11/60
10,318,917 B1 * 6/2019 Goldstein ............ G06Q 20/203
(Continued)

FOREIGN PATENT DOCUMENTS

| CN | 102063616 A | 5/2011 |
| CN | 104269003 A | 1/2015 |

(Continued)

OTHER PUBLICATIONS

Wu, Bing-Fei, et al. "An intelligent self-checkout system for smart retail." 2016 International Conference on System Science and Engineering (ICSSE). IEEE, 2016. (Year: 2016).*
(Continued)

*Primary Examiner* — Nathan A Mitchell
(74) *Attorney, Agent, or Firm* — Oblon, McClleand, Maier & Neustadt, L.L.P.

(57) ABSTRACT

An automatic vending method and apparatus, and a computer-readable storage medium, relating to the field of automatic vending machines. The method includes: obtaining an image from a photographed video stream of commodities in an automatic vending machine; positioning an image of a commodity picked up by a user from the image;
(Continued)

obtaining a change value of load weight of a shelf where the commodity is picked up by the user; determining a possible combination of commodities corresponding to the change value of load weight according to a weight of each commodity in the automatic vending machine; recognizing information of the commodity corresponding to the image of the commodity picked up by the user according to a pre-established commodity feature library and in conjunction with the possible combination of commodities; and performing settlement automatically for the user according to the recognized information of the commodity.

8 Claims, 4 Drawing Sheets

(58) Field of Classification Search
CPC .......... G07F 9/023; G07F 9/026; G07F 11/00; G06V 20/40; G07G 1/0063
See application file for complete search history.

(56) References Cited

U.S. PATENT DOCUMENTS

| | | | |
|---|---|---|---|
| 10,332,066 B1* | 6/2019 | Palaniappan | G01G 19/42 |
| 10,510,219 B1* | 12/2019 | Zalewski | G07G 1/0072 |
| 11,087,273 B1* | 8/2021 | Bergamo | G06V 10/751 |
| 11,132,637 B1* | 9/2021 | Hahn | H04W 4/35 |
| 11,164,148 B1* | 11/2021 | Gopal | G01G 19/42 |
| 11,176,686 B2* | 11/2021 | Mirza | G06T 7/73 |
| 11,250,606 B2* | 2/2022 | Glaser | G06T 7/11 |
| 2013/0284806 A1* | 10/2013 | Margalit | G07G 1/0009 235/382 |
| 2014/0316916 A1* | 10/2014 | Hay | G06Q 20/20 705/17 |
| 2017/0148005 A1* | 5/2017 | Murn | G06Q 30/0631 |
| 2018/0096566 A1* | 4/2018 | Blair, II | G06Q 20/208 |
| 2018/0204562 A1 | 7/2018 | Gong et al. | |
| 2018/0218351 A1* | 8/2018 | Chaubard | G01G 19/4144 |
| 2018/0240180 A1* | 8/2018 | Glaser | G06V 20/64 |
| 2018/0276602 A1* | 9/2018 | Rivalto | G07G 1/0036 |
| 2019/0378205 A1* | 12/2019 | Glaser | G06Q 30/0643 |
| 2020/0364997 A1* | 11/2020 | Okamoto | G06V 20/52 |
| 2021/0035399 A1* | 2/2021 | Dai | G06K 7/1417 |
| 2021/0043022 A1* | 2/2021 | Ji | G07F 11/06 |
| 2021/0056498 A1* | 2/2021 | Liu | G01G 19/42 |
| 2021/0067744 A1* | 3/2021 | Buibas | G06K 9/6274 |
| 2021/0073765 A1* | 3/2021 | Xu | G07F 11/02 |
| 2021/0133835 A1* | 5/2021 | Gu | G06Q 10/08 |
| 2021/0158430 A1* | 5/2021 | Buibas | G06V 10/255 |
| 2021/0374815 A1* | 12/2021 | Smith | G07F 11/1657 |

FOREIGN PATENT DOCUMENTS

| | | |
|---|---|---|
| CN | 105095919 A | 11/2015 |
| CN | 105894362 A | 8/2016 |
| CN | 105931371 A | 9/2016 |
| CN | 106326852 A | 1/2017 |
| CN | 106952402 A | 7/2017 |
| CN | 107274172 A | 10/2017 |
| CN | 107393152 A | 11/2017 |
| CN | 206757798 U | 12/2017 |
| CN | 107679850 A | 2/2018 |
| CN | 108389316 A | 8/2018 |
| JP | 2013-106257 A | 5/2013 |

OTHER PUBLICATIONS

Bishop, Todd. "How 'Amazon Go' works: The technology behind the online retailer's groundbreaking new grocery store". Retrieved from <https://www.geekwire.com/2016/amazon-go-works-technology-behind-online-retailers-groundbreaking-new-grocery-store/>. Originally published Dec. 2016. (Year: 2016).*
International Search Report dated Apr. 28, 2019 in PCT/CN2019/075078 filed on Feb. 14, 2019, 3 pages.
Chinese Office Action dated May 30, 2019 in Application No. 201810174847.X filed Mar. 2, 2018, 22 pages (with unedited computer-generated English translation).
Chinese Office Action dated Dec. 12, 2019 in Application No. 201810174847.X filed on Mar. 2, 2018, 19 pages (with unedited computer-generated English translation).
Chinese Office Action dated Jun. 23, 2020 in Application No. 201810174847.X filed on Mar. 2, 2018, 23 pages (with unedited computer-generated English translation).

* cited by examiner

AUTOMATIC VENDING METHOD AND APPARATUS, AND COMPUTER-READABLE STORAGE MEDIUM

CROSS-REFERENCE TO RELATED APPLICATIONS

The present disclosure is a U.S. National Stage Application under 35 U.S.C. § 371 of International Patent Application No. PCT/CN2019/075078, filed on Feb. 14, 2019, which is based on and claims priority to China Patent Application No. 201810174847.X filed on Mar. 2, 2018, the disclosure of both of which are incorporated into this disclosure by reference in its entirety.

TECHNICAL FIELD

The present disclosure relates to the field of an automatic vending machine, and particularly to an automatic vending method and apparatus, and a computer-readable storage medium.

BACKGROUND

With the development of technology, unmanned supermarkets and unmanned convenience stores have become revolutionary forms that overthrow traditional retail, and various automatic vending machines have also emerged as needed.

In the related art, the purchase process of the automatic vending machine is that a user first recognizes commodities through the glass of the automatic vending machine, then selects a commodity by touching the screen or pressing a button, and next pays for the commodity in a manner such as coin feeding or payment application; finally, the commodity slides out of the commodity outlet of the automatic vending machine.

SUMMARY

According to one aspect of the present disclosure, an automatic vending method is provided. The method comprises: obtaining an image from a photographed video stream of commodities in an automatic vending machine; positioning an image of a commodity picked up by a user from the image; recognizing information of the commodity corresponding to the image of the commodity picked up by the user according to a pre-established commodity feature library; and performing settlement automatically for the user according to the recognized information of the commodity.

In some embodiments, positioning an image of a commodity picked up by a user from the image comprises: inputting the image into a commodity positioning model, which outputs the image of the commodity picked up by the user, wherein the commodity positioning model is obtained by training using images of a plurality of commodities and marked information of positions of the commodities.

In some embodiments, recognizing information of the commodity corresponding to the image of the commodity picked up by the user comprises: inputting the image of the commodity picked up by the user into a commodity recognizing model, which outputs a commodity feature corresponding to the image of the commodity picked up by the user, wherein the commodity recognizing model is obtained by training using images of a plurality of commodities and marked information of classifications of the commodities; and matching the commodity feature output by the commodity recognizing model with commodity features in the commodity feature library and making marked information of classification corresponding to the commodity feature matched in the commodity feature library serve as the information of the commodity corresponding to the image of the commodity picked up by the user.

In some embodiments, the commodity feature library is established or updated using the following method: inputting an image of a commodity into the commodity recognizing model, which outputs commodity feature corresponding to the image of the commodity, wherein the image of the commodity has marked information of classification of the commodity and comprises at least one of images of existing commodities and images of new commodities; and storing the commodity feature corresponding to the image of the commodity output by the commodity recognizing model and the marked information of classification of the commodity in the commodity feature library.

In some embodiments, the method further comprises: tracking a movement trajectory of the commodity picked up by the user according to a plurality of images of the commodity picked up by the user; and triggering an automatic settlement operation when a movement range of the commodity picked up by the user is beyond a specified area.

In some embodiments, image processing is performed using a convolutional neural network model to position an image of a commodity picked up by a user from the image and recognize information of the commodity corresponding to the image of the commodity picked up by the user.

In some embodiments, video stream capturing apparatuses in the automatic vending machine are provided in a way that: a video stream capturing apparatus is provided on an inner wall of a top end of the automatic vending machine proximate to a cabinet door; and video stream capturing apparatuses are provided on an inner wall of a lateral surface of each shelf in the automatic vending machine, wherein video stream capturing apparatuses are alternately provided on inner walls of both lateral surfaces of two adjacent shelves.

In some embodiments, the method further comprises: obtaining a change value of load weight of a shelf where the commodity is picked up by the user; determining a possible combination of commodities corresponding to the change value of load weight according to a weight of each commodity in the automatic vending machine, wherein the possible combination of commodities comprises at least one possible commodity; wherein recognizing information of the commodity corresponding to the image of the commodity picked up by the user comprises: recognizing information of the commodity corresponding to the image of the commodity picked up by the user according to the commodity feature library and in conjunction with the possible combination of commodities.

In some embodiments, the method further comprises: determining a confidence degree of the possible combination of commodities according to a preset condition, wherein the preset condition comprises at least one of information of difference between a weight of the possible combination of commodities and the change value of load weight, or quantity of commodities in the possible combination of commodities, wherein recognizing information of the commodity corresponding to the image of the commodity picked up by the user comprises: recognizing information of the commodity corresponding to the image of the commodity picked up by the user according to the commodity feature library and in conjunction with the possible combination of commodities with a confidence degree higher than a preset value.

According to another aspect of the present disclosure, an automatic vending apparatus is provided. The apparatus comprises: an image obtaining module configured to obtain an image from a photographed video stream of commodities in an automatic vending machine; a commodity positioning module configured to position an image of a commodity picked up by a user from the image; a commodity recognizing module configured to recognize information of the commodity corresponding to the image of the commodity picked up by the user according to a pre-established commodity feature library; and a settlement module configured to perform settlement automatically for the user according to the recognized information of the commodity.

In some embodiments, the commodity positioning module is configured to input the image into a commodity positioning model, which outputs the image of the commodity picked up by the user, wherein the commodity positioning model is obtained by training using images of a plurality of commodities and marked information of positions of the commodities.

In some embodiments, the commodity recognizing module is configured to input the image of the commodity picked up by the user into a commodity recognizing model, which outputs a commodity feature corresponding to the image of the commodity picked up by the user, wherein the commodity recognizing model is obtained by training using images of a plurality of commodities and marked information of classifications of the commodities; and match the commodity feature output by the commodity recognizing model with commodity features in the commodity feature library and make marked information of classification corresponding to the commodity feature matched in the commodity feature library serve as the information of the commodity corresponding to the image of the commodity picked up by the user.

In some embodiments, the apparatus further comprises: a feature library module configured to input an image of a commodity into the commodity recognizing model, which outputs commodity feature corresponding to the image of the commodity, wherein the image of the commodity has marked information of classification of the commodity and comprises at least one of images of existing commodities and images of new commodities; and store the commodity feature corresponding to the image of the commodity output by the commodity recognizing model and the marked information of classification of the commodity in the commodity feature library.

In some embodiments, the apparatus further comprises: a commodity tracking module, configured to track a movement trajectory of the commodity picked up by the user according to a plurality of images of the commodity picked up by the user; and trigger an automatic settlement operation when a movement range of the commodity picked up by the user is beyond a specified area.

In some embodiments, the commodity positioning module uses a convolutional neural network model to perform image processing to position an image of a commodity picked up by a user from the image; the commodity recognizing module uses a convolutional neural network model to perform image processing to recognize information of the commodity corresponding to the image of the commodity picked up by the user.

In some embodiments, the apparatus further comprises: an auxiliary recognizing module configured to obtain a change value of load weight of a shelf where the commodity picked up by the user is placed, and determine a possible combination of commodities corresponding to the change value of load weight according to a weight of each commodity in the automatic vending machine, wherein the possible combination of commodities comprises at least one possible commodity; the commodity recognizing module is configured to recognize information of the commodity corresponding to the image of the commodity picked up by the user according to the commodity feature library and in conjunction with the possible combination of commodities.

In some embodiments, the auxiliary recognizing module is further configured to determine a confidence degree of the possible combination of commodities according to a preset condition, wherein the preset condition comprises at least one of information of difference between a weight of the possible combination of commodities and the change value of load weight, or quantity of commodities in the possible combination of commodities; the commodity recognizing module is configured to recognize information of the commodity corresponding to the image of the commodity picked up by the user according to the commodity feature library and in conjunction with the possible combination of commodities with a confidence degree higher than a preset value.

According to another aspect of the present disclosure, an automatic vending apparatus is provided. The apparatus comprises: a memory; and a processor coupled to the memory, wherein the processor is configured to execute the automatic vending method described above according to instructions stored in the memory.

According to another aspect of the present disclosure, there is provided a computer-readable storage medium storing a computer program, which implements the automatic vending method described above when executed by a processor.

According to another aspect of the present disclosure, there is provided an automatic vending machine comprising: an automatic vending apparatus described above; one or more video stream capturing apparatuses; and one or more weighing apparatuses each of which is set for each shelf in the automatic vending machine.

BRIEF DESCRIPTION OF THE DRAWINGS

A brief introduction will be given below for the accompanying drawings required to be used in the description of the embodiments or the relevant art. The present disclosure may be more clearly understood according to the following detailed description with reference to the accompanying drawings.

It is obvious that, the drawings illustrated as follows are merely some of the embodiments of the present disclosure. For those skilled in the art, they may also acquire other drawings according to such drawings on the premise that no inventive effort is involved.

DETAILED DESCRIPTION

Next, the technical solution in the embodiments of the present disclosure will be explicitly and completely described in combination with the accompanying drawings in the embodiments of the present disclosure.

The inventors have found that in the related art mentioned in the background section, there is limited information of a commodity available for the user before purchase, and the commodity is obtained after payment. If a mistake is made in purchase, it is impossible to return the commodity so that the shopping experience needs to be enhanced.

One technical problem to be solved by the embodiments of the present disclosure is to enhance the shopping experience in the automatic vending scenario.

Figure 1:
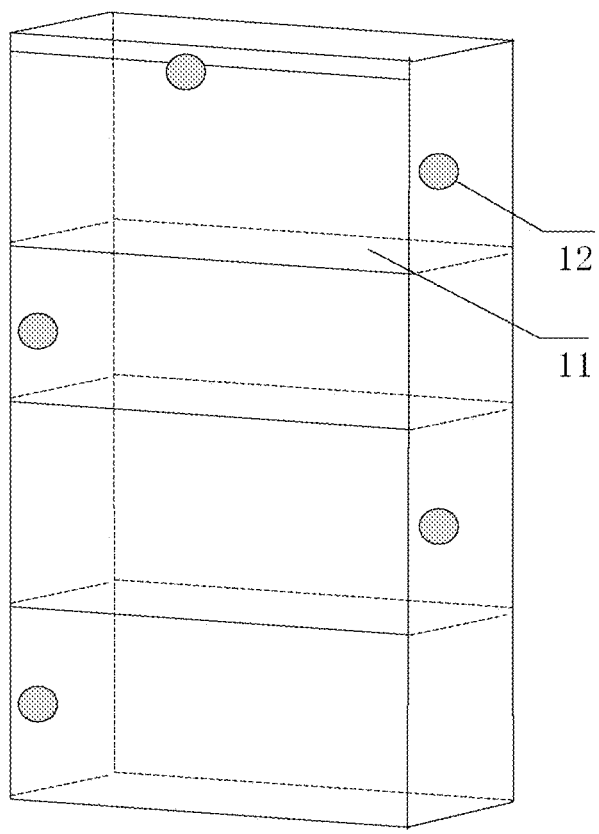
FIG. 1 is a schematic view of some embodiments of an automatic vending machine of the present disclosure.

FIG. 1 is a schematic view of some embodiments of an automatic vending machine of the present disclosure.

As shown in FIG. 1, the automatic vending machine generally has a plurality of shelves 11 where commodities may be laid out, and the automatic vending machine is internally provided with a video stream capturing apparatus 12. In order to more comprehensively capture the commodities as well as the conditions of picking up and putting back the commodities, it is possible to provide a video stream capturing apparatus on the inner wall of the top end of the automatic vending machine proximate to the cabinet door, and provide video stream capturing apparatuses on the inner wall of a lateral surface of each shelf in the automatic vending machine, wherein video stream capturing apparatuses are alternately arranged on the inner walls of both lateral surfaces of two adjacent shelves. For example, from top to bottom, a capturing apparatus is provided on the right inner wall of the first shelf, a capturing apparatus is provided on the left inner wall of the second shelf, a capturing apparatus is provided on the right inner wall of the third shelf, and a capturing apparatus is provided on the left inner wall of the fourth shelf.

In the automatic vending application scenario, a user opens the cabinet door of the automatic vending machine, and purchases a commodity in an open environment, while the capturing apparatus records videos within the automatic vending machine and within the ambient preset range, and transmits the recorded video streams to the automatic vending apparatus. The automatic vending apparatus accurately recognizes the commodity intended to be purchased by the user by technologies such as video image processing and weight detection, and automatically performs settlement. In some embodiments, the automatic vending apparatus may be a server or a cloud server, for example. The server or cloud server provides services for several automatic vending machines. The automatic vending process will be described below in conjunction with FIGS. 2 and 3.

Figure 2:
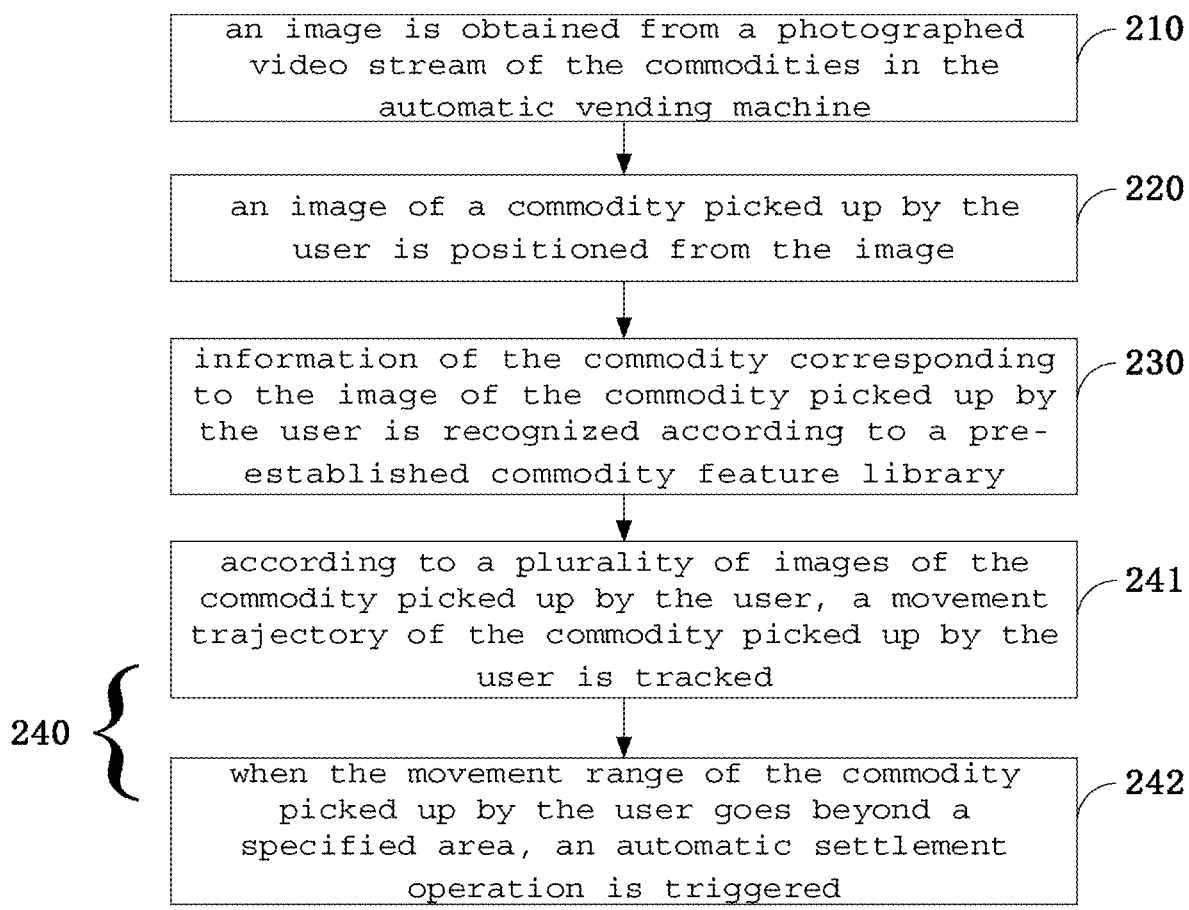
FIG. 2 is a schematic flowchart of some embodiments of an automatic vending method of the present disclosure.

FIG. 2 is a schematic flowchart of some embodiments of an automatic vending method of the present disclosure.

As shown in FIG. 2, the automatic vending method of this embodiment comprises steps 210-240, which may be performed by an automatic vending apparatus, for example.

In step 210, an image is obtained from a photographed video stream of the commodities in the automatic vending machine.

If there are a plurality of video streams, it is possible to obtain images from each video stream respectively and perform subsequent image processing on each image obtained.

In step 220, an image of a commodity picked up by the user is positioned from the image.

In some embodiments, the image is input to a commodity positioning model, which locates and outputs an image of a commodity picked up by the user. The commodity positioning model may be, for example, a convolutional neural network model.

The commodity positioning model may be trained before use. The commodity positioning model is obtained by training using the images of a plurality of commodities and marked information of positions of the commodities. Specifically, for the images of a plurality of commodities, for example, the positions of the commodities in the images are marked using a manual marking method for example, and then the images of a plurality of commodities and the marked information of the positions of the commodities are input into the commodity positioning model, which obtains whether the commodities are present in the images as well as the approximate positions of the commodities by training. The approximate positions of the commodities recognized by the model are compared with the marked positions of the commodities to determine whether the comparison result meets the requirements of a loss function constructed for the positions of the commodities. By repeated iteration, the parameters of the commodity positioning model are optimized and adjusted so that the comparison result finally meets the requirements of a loss function constructed for the positions of the commodities, and the commodity positioning model is saved.

In step 230, information of the commodity corresponding to the image of the commodity picked up by the user is recognized according to a pre-established commodity feature library.

In some embodiments, an image of the commodity picked up by the user is input into the commodity recognizing model, which outputs the commodity feature corresponding to the image of the commodity picked up by the user. Wherein the commodity recognizing model may be, for example, a convolutional neural network model. Then, the commodity feature output by the commodity recognizing model is matched with the commodity features in the commodity feature library, and the marked information of classification of the commodity corresponding to the commodity feature matched in the commodity feature library is served as the information of the commodity corresponding to the image of the commodity picked up by the user.

The commodity recognizing model may be trained before use. The commodity recognizing model is obtained by training using images of a plurality of commodities and marked information of classifications of the commodities. Specifically, for the images of a plurality of commodities, for example, the classifications of the commodities in the images which are marked using a manual marking method, may be specific to the SKU (Stock Keeping Unit) levels of the commodities, not only the categories to which the commodities belong. Then, the images of a plurality of commodities and the marked information of classifications of the commodities are input into the commodity recognizing model, which obtains the probability information of classifications of the commodities in the images by training, so that the commodity classification with a maximum probability may be determined as a commodity recognition result. Then, the classifications of the commodities recognized by the model are compared with the marked classifications of the commodities to determine whether the comparison result meets the requirements of a loss function constructed for the classifications of the commodities. By repeated iteration, the parameters of the commodity recognizing model are optimized and adjusted so that the comparison result finally meets the requirements of a loss function constructed for the classifications of the commodities, and the commodity recognizing model is saved.

In some embodiments, the commodity feature library may be established by the following method: the images of the existing commodities are input into the commodity recognizing model, which outputs the commodity features corresponding to the images of the commodities, wherein the images of the existing commodities have marked information of classifications of the commodities. Then, the commodity features corresponding to the images of the commodities output by the commodity recognizing model and the marked information of classifications of the commodities are together stored in the commodity feature library.

In some embodiments, the commodity feature library may be updated by the following method: the images of new commodities are input into the commodity recognizing model, which outputs the commodity features corresponding to the images of the commodities, wherein the images of new commodities have marked information of classifications of the commodities. Then, the commodity features corresponding to the images of the commodities output by the commodity recognizing model and the marked information of classifications of the commodities are together stored in the commodity feature library. It may be seen that the commodity database may be updated by adding the commodity features to the feature library without retraining the model.

In step 240, settlement is automatically performed for the user according to the recognized information of the commodity.

In some embodiments, in step 241, according to a plurality of images of the commodity picked up by the user, a movement trajectory of the commodity picked up by the user is tracked. In step 242, when the movement range of the commodity picked up by the user goes beyond a specified area, an automatic settlement operation is triggered. On the contrary, when the movement range of the commodity picked up by the user is still in a specified area, for example, the commodity held by the user is still within a shelf range, settlement will not be performed temporarily.

By a video image processing technology, the commodity intended to be purchased by the user is positioned and recognized, and settlement is performed automatically based on a commodity recognition result. This vending manner allows the user to pick up a commodity before payment, so that the user may contact and adequately learn about a commodity before purchase. Moreover, since settlement is performed automatically, the settlement is simpler, without standing in a queue or performing an additional settlement operation such as scanning QR code, thereby enhancing the shopping experience in the automatic vending scenario.

Figure 3:
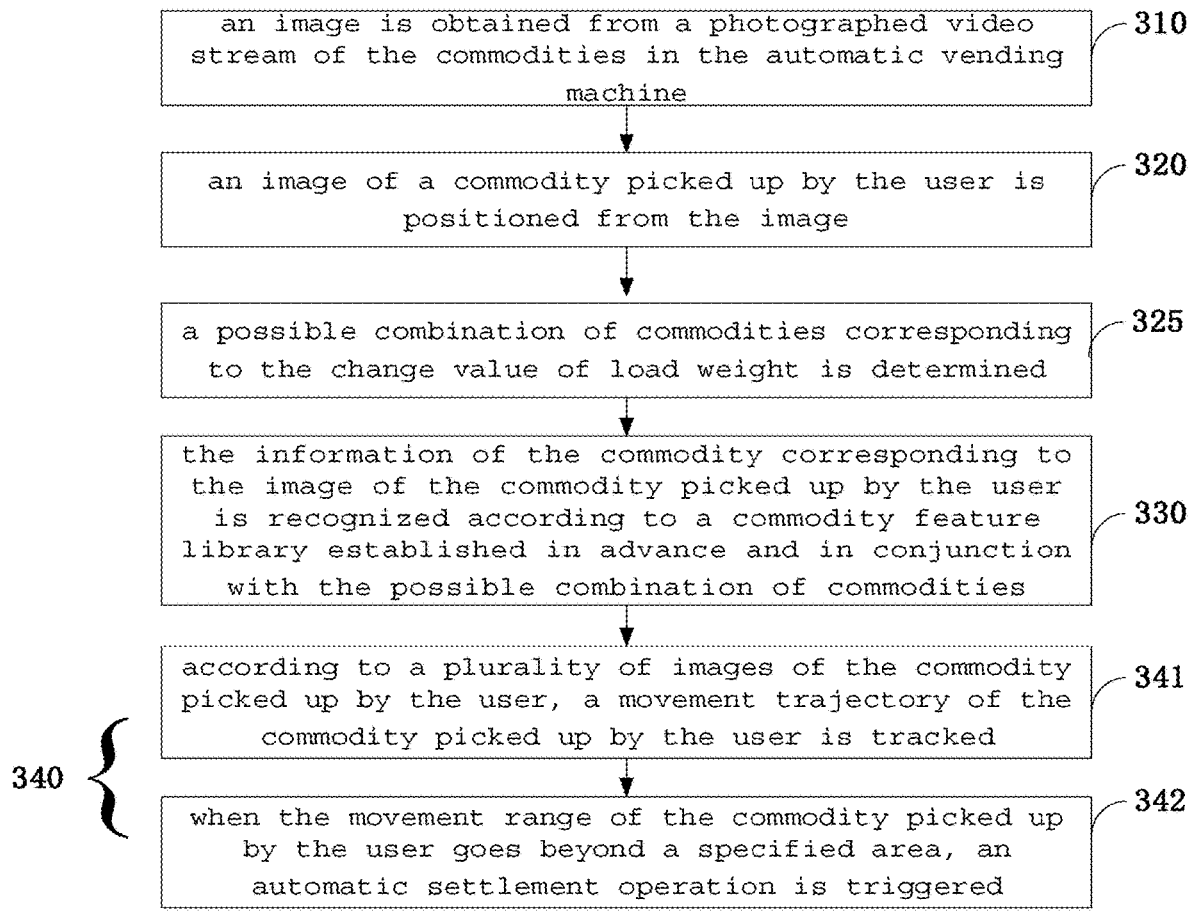
FIG. 3 is a schematic flowchart of other embodiments of the automatic vending method of the present disclosure.

FIG. 3 is a schematic flowchart of other embodiments of the automatic vending method of the present disclosure.

As shown in FIG. 3, the automatic vending method of this embodiment comprises steps 310-340, which may be performed by an automatic vending apparatus, for example.

In step 310, an image is obtained from a photographed video stream of the commodities in the automatic vending machine.

In step 320, an image of a commodity picked up by the user is positioned from the image. Specifically, reference may be made to the step 220.

In step 325, a change value of load weight of the shelf where a commodity is picked up by the user is obtained, and a possible combination of commodities corresponding to the change value of load weight is determined according to a weight of each commodity in the automatic vending machine. The possible combination of commodities comprises at least one possible commodity.

In some embodiments, a possible combination of commodities corresponding to the change value of load weight is determined from the unsettled commodities. Wherein the unsettled commodities comprise at least one of commodities on the shelf and commodities to be settled. In some embodiments, if the load weight of the shelf decreases, it is indicated that there is a possible behavior of picking up a commodity from the shelf by the user, so that a possible combination of commodities corresponding to the change value of load weight may be determined from the commodities on the shelf. If the load weight of the shelf increases, it is indicated that there is a possible behavior of putting a commodity back on the shelf so that a possible combination of commodities corresponding to the change value of load weight may be determined from the commodities to be settled. In some cases, there might also be a behavior of picking up a commodity and putting back a commodity at the same time, which behavior might also occur in the case where the load weight of the shelf increases or decreases. At this time, a possible combination of commodities corresponding to the change value of load weight may be determined from the commodities on the shelf and the commodities to be settled, so that it is still possible to recognize a commodity that is picked up and a commodity that is put back in the case of picking up a commodity and putting back a commodity at the same time. Wherein, the commodities on the shelf are the commodities on the shelf before the load weight of the shelf changes. Wherein, the commodities to be settled are commodities to be settled before the load weight of the shelf changes, that is, commodities that have been picked up from the shelf by the user but have not been settled. The commodities to be settled may be regarded as commodities that have been put into the shopping cart by the user. The "shopping cart" may be a physical apparatus or a virtual apparatus. In addition to the names or labels as well as quantities of the commodities, the combination of commodities may also comprise sources of the commodities, that is, to indicate whether the commodities are commodities on the shelf or commodities to be settled.

For example, on a current shelf, if the commodity A has a single weight of 210 g and commodity B has a single weight of 250 g, suppose there are one commodity A and two commodities B; there is a commodity C in the shopping cart, with a weight of 380 g. Then, all combinations of unsettled commodities are shown in Table 1. The combination {A} indicates that the user picks up A from the shelf, the combination {C} indicates that the user puts the C to be settled in the shopping cart back on the shelf, and the combination {B, C} indicates that the user picks up B from the shelf and puts C to be settled in the shopping cart back on the shelf at the same time. It may be seen that the present embodiment supports the recognition of commodities such conditions as picking up a commodity, putting back a commodity, and picking up a commodity and putting back a commodity at the same time.

The weighing apparatus of the shelf senses a reduced weight of 250 g, and a possible combination of commodities corresponding to the change value of load weight of 250 g is {B}.

TABLE 1

| Combination of commodities | Corresponding to change weight (g) |
|---|---|
| A | 210 |
| B | 250 |
| C | −380 |
| A A | 420 |
| A B | 460 |
| A C | −170 |
| B C | −130 |
| A B C | −20 |

In step 330, the information of the commodity corresponding to the image of the commodity picked up by the user is recognized according to a commodity feature library established in advance and in conjunction with the possible combination of commodities.

In some embodiments, the candidate information of the commodity corresponding to an image of a commodity picked up by the user is recognized based on the commodity feature library established in advance. If the candidate information of the commodity is also a possible combination of commodities, the candidate information of the commodity is determined to be the information of the commodity corresponding to an image of a commodity picked up by the user. Otherwise, if the candidate information of the commodity is not a possible combination of commodities, the recognition of the candidate information of the commodity is incorrect, and other candidate information of the commodity is selected.

Further, the confidence degree of a possible combination of commodities is determined according to a preset condition; the preset condition comprises at least one of the following: information of difference between a weight of a possible combination of commodities and a change value of load weight, and quantity of commodities in a possible combination of commodities. The smaller the weight difference is, the higher the confidence degree will be. The less the quantity of commodities in a possible combination of commodities is, the higher the confidence degree will be. Based on the commodity feature library and in conjunction with a possible combination of commodities with a confidence degree higher than a preset value, the information of the commodity corresponding to an image of a commodity picked up by the user is recognized.

In step 340, settlement is performed automatically for the user according to the recognized information of the commodity. Specifically, reference may be made to step 240.

By video image processing technology and weight detection technology, it is possible to more accurately recognize the commodities intended to be purchased by the user. Moreover, settlement is performed automatically based on a commodity recognition result, so that the settlement is more accurate and simpler, thereby enhancing the shopping experience in the automatic vending scenario.

Figure 4:
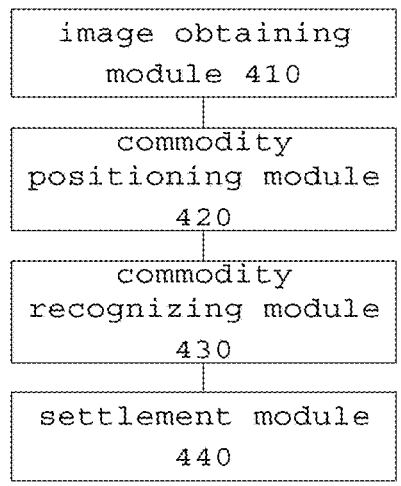
FIG. 4 is a schematic structural view of some embodiments of an automatic vending apparatus of the present disclosure.

FIG. 4 is a schematic structural view of some embodiments of an automatic vending apparatus of the present disclosure.

As shown in FIG. 4, the automatic vending apparatus of this embodiment comprises: an image obtaining module 410 configured to obtain an image from a photographed video stream of commodities in an automatic vending machine; a commodity positioning module 420 configured to position an image of a commodity picked up by a user from the image; a commodity recognizing module 430 configured to recognize information of the commodity corresponding to the image of the commodity picked up by the user according to a pre-established commodity feature library; and a settlement module 440 configured to perform settlement automatically for the user according to the recognized information of the commodity.

In some embodiments, the commodity positioning module 420 is configured to input the image into a commodity positioning model, which outputs the image of the commodity picked up by the user, wherein the commodity positioning model is obtained by training using images of a plurality of commodities and marked information of positions of the commodities.

In some embodiments, the commodity positioning module 420 uses a convolutional neural network model to perform image processing to position an image of a commodity picked up by a user from the image.

In some embodiments, the commodity recognizing module 430 is configured to input the image of the commodity picked up by the user into a commodity recognizing model, which outputs a commodity feature corresponding to the image of the commodity picked up by the user, wherein the commodity recognizing model is obtained by training using images of a plurality of commodities and marked information of classifications of the commodities; and match the commodity feature output by the commodity recognizing model with commodity features in the commodity feature library and make marked information of classification corresponding to the commodity feature matched in the commodity feature library serve as the information of the commodity corresponding to the image of the commodity picked up by the user.

In some embodiments, the commodity recognizing module 430 uses a convolutional neural network model to perform image processing to recognize information of the commodity corresponding to the image of the commodity picked up by the user.

Figure 5:
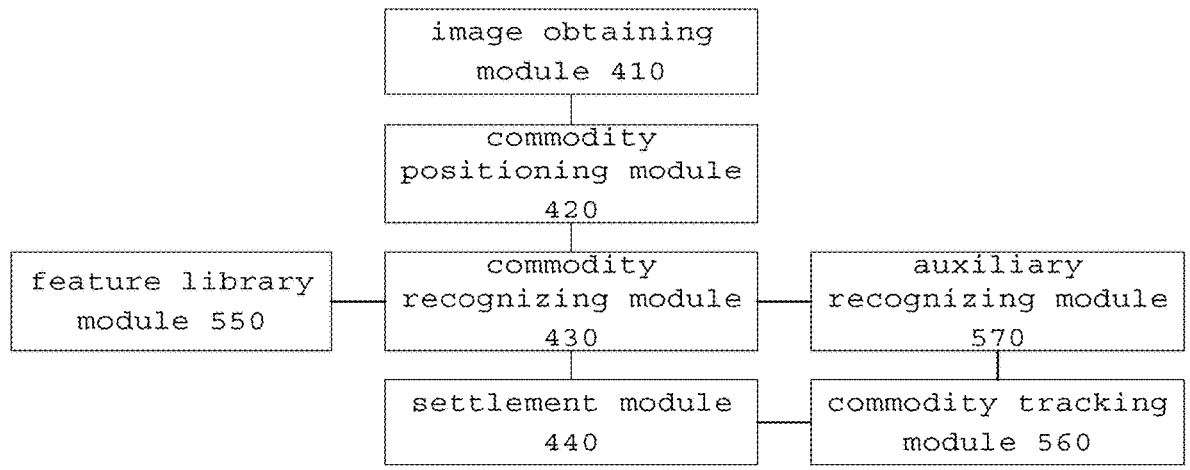
FIG. 5 is a schematic structural view of other embodiments of the automatic vending apparatus of the present disclosure.

FIG. 5 is a schematic structural view of other embodiments of the automatic vending apparatus of the present disclosure.

In some embodiments, the automatic vending apparatus further comprises: a feature library module configured to input an image of a commodity into the commodity recognizing model, which outputs commodity feature corresponding to the image of the commodity, wherein the image of the commodity has marked information of classification of the commodity and comprises at least one of images of existing commodities and images of new commodities; and store the commodity feature corresponding to the image of the commodity output by the commodity recognizing model and the marked information of classification of the commodity in the commodity feature library.

In some embodiments, the automatic vending apparatus further comprises: a commodity tracking module 560, configured to track a movement trajectory of the commodity picked up by the user according to a plurality of images of the commodity picked up by the user; and trigger an automatic settlement operation when a movement range of the commodity picked up by the user is beyond a specified area.

In some embodiments, the automatic vending apparatus further comprises: an auxiliary recognizing module 570 configured to obtain a change value of load weight of a shelf where the commodity picked up by the user is placed, and determine a possible combination of commodities corresponding to the change value of load weight according to a weight of each commodity in the automatic vending machine, wherein the possible combination of commodities comprises at least one possible commodity; a commodity recognizing module 430 configured to recognize information of the commodity corresponding to the image of the commodity picked up by the user according to the commodity feature library and in conjunction with the possible combination of commodities.

In some embodiments, the auxiliary recognizing module 570 is further configured to determine a confidence degree of the possible combination of commodities according to a preset condition, wherein the preset condition comprises at least one of information of difference between a weight of the possible combination of commodities and the change value of load weight, or quantity of commodities in the possible combination of commodities. The commodity recognizing module 430 is configured to recognize information of the commodity corresponding to the image of the commodity picked up by the user according to the commodity feature library and in conjunction with the possible combination of commodities with a confidence degree higher than a preset value.

Figure 6:
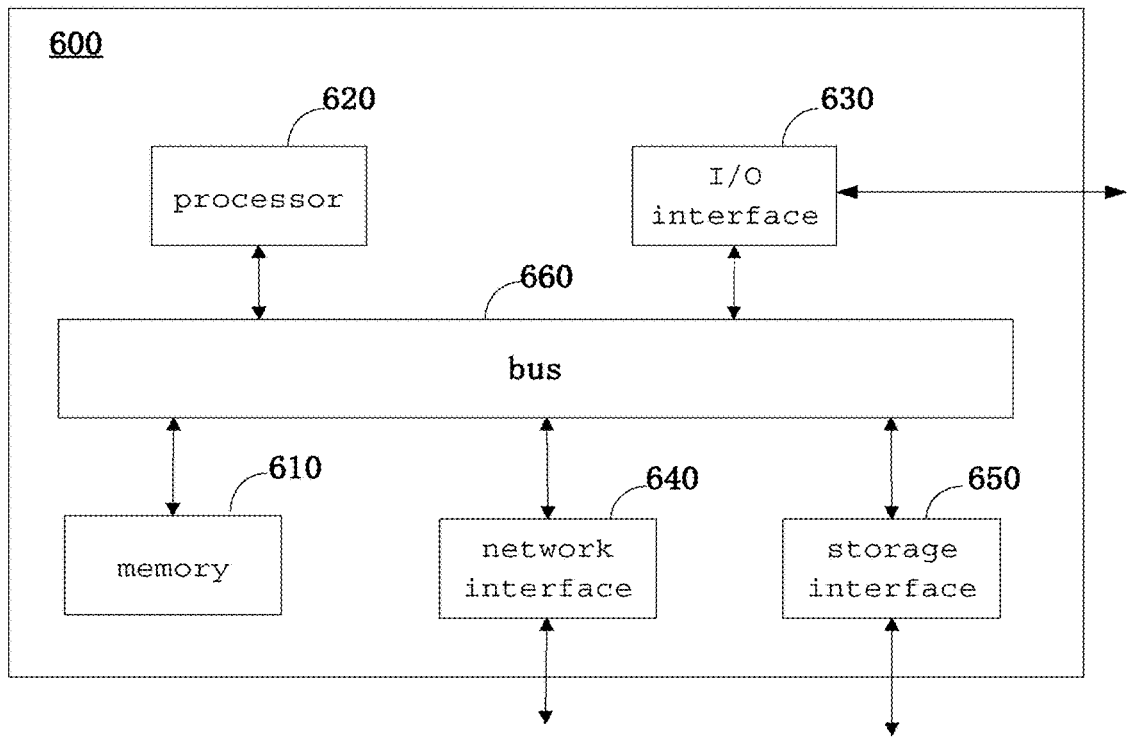
FIG. 6 is a schematic structural view of some embodiments of the automatic vending apparatus of the present disclosure.

FIG. 6 is a schematic structural view of some embodiments of the automatic vending apparatus of the present disclosure. As shown in FIG. 6, the apparatus 600 of this embodiment comprises: a memory 610 and a processor 620 coupled to the memory 610. The processor 620 is configured to implement the automatic vending method in any of the foregoing embodiments based on instructions stored in the memory 610.

The memory 610 may comprise, for example, a system memory, a fixed non-volatile storage medium, and the like. The system memory stores, for example, an operation system, an application program, a boot loader (Boot Loader), and other programs.

The apparatus 600 may further comprise an I/O (Input/output) interface 630, a network interface 640, a storage interface 650, and the like. These interfaces 630, 640, 650 as well as the memory 610 and the processor 620 therebetween may be connected, for example, via a bus 660. Wherein, the I/O interface 630 provides a connection interface for input/output apparatus such as a display, a mouse, a keyboard, and a touch screen. The network interface 640 provides a connection interface for various networked apparatus. The storage interface 650 provides a connection interface for an external storage apparatus such as an SD card or a USB flash disk.

The present disclosure also proposes a computer-readable storage medium stored a computer program, which implements the automatic vending method in any of the foregoing embodiments when executed by a processor.

Those skilled in the art will appreciate that the embodiments of the present disclosure may be provided as a method, system, or computer program commodity. Accordingly, the present disclosure may take the form of an entirely hardware embodiment, an entirely software embodiment, or a combination of software and hardware aspects. Moreover, the present disclosure may take the form of a computer program commodity embodied in one or more computer-usable non-transitory storage media (including but not limited to disk memory, CD-ROM, optical memory, and the like) containing computer usable program codes therein.

The present disclosure is described in conjunction with the flow charts and/or block views of methods, apparatus (systems), and computer program commodities according to the embodiments of the present disclosure. It will be understood that each step and/or block of the flow charts and/or block views as well as a combination of steps and/or blocks of the flow charts and/or block views may be implemented by a computer program instruction. These computer program instructions may be provided to a processor of a general purpose computer, special purpose computer, an embedded processing machine, or other programmable data processing apparatus to produce a machine, such that the instructions executed by a processor of a computer or other programmable data processing apparatus produce an apparatus for realizing a function designated in one or more steps of a flow chart and/or one or more blocks in a block view.

These computer program instructions may also be stored in a computer readable memory that may guide a computer or other programmable data processing apparatus to operate in a particular manner, such that the instructions stored in the computer readable memory produce a manufacture including an instruction apparatus. The instruction apparatus realizes a function designated in one or more steps in a flow chart or one or more blocks in a block view.

These computer program instructions may also be loaded onto a computer or other programmable data processing apparatus, such that a series of operational steps are performed on a computer or other programmable apparatus to produce a computer-implemented processing, such that the instructions executed on a computer or other programmable apparatus provide steps for realizing a function designated in one or more steps of the flow chart and/or one or more blocks in the block view.

The foregoing descriptions are only the preferred embodiments of the present disclosure, but do not serve to limit the present disclosure. Any amendment, equivalent replacement, improvement, and the like made within the spirit and principles of the present disclosure should all be contained within the protection scope of the present disclosure.

What is claimed is:

1. An automatic vending method, comprising:
   alternately arranging a plurality of video stream capturing apparatuses on inner walls of two lateral surfaces of every two adjacent shelves in an automatic vending machine;
   obtaining an image from a video stream of commodities in the automatic vending machine photographed by the plurality of video stream capturing apparatuses;
   positioning an image of a commodity picked up by a user from the image;
   obtaining a change value of load weight of a shelf where the commodity is picked up by the user;
   determining a possible combination of commodities corresponding to the change value of load weight according to a weight of each commodity in the automatic vending machine, wherein the possible combination of commodities comprises at least one possible commodity;
   recognizing information of the commodity corresponding to the image of the commodity picked up by the user according to a pre-established commodity feature library and in conjunction with the possible combination of commodities; and
   performing settlement automatically for the user according to the recognized information of the commodity.

2. The automatic vending method according to claim 1, wherein positioning an image of a commodity picked up by a user from the image comprises:
   inputting the image into a commodity positioning model, which outputs the image of the commodity picked up by the user, wherein the commodity positioning model is obtained by training using images of a plurality of commodities and marked information of positions of the commodities.

3. The automatic vending method according to claim 1, wherein recognizing information of the commodity corresponding to the image of the commodity picked up by the user comprises:
   inputting the image of the commodity picked up by the user into a commodity recognizing model, which outputs a commodity feature corresponding to the image of the commodity picked up by the user, wherein the commodity recognizing model is obtained by training using images of a plurality of commodities and marked information of classifications of the commodities;
   matching the commodity feature output by the commodity recognizing model with commodity features in the commodity feature library and making marked information of classification corresponding to the commodity feature matched in the commodity feature library serve as information of a candidate commodity corresponding to the image of the commodity picked up by the user; and
   determining the information of the candidate commodity to be the information of the commodity corresponding to the image of a commodity picked up by the user in the case that the candidate commodity is the possible combination of commodities.

4. The automatic vending method according to claim 3, wherein the commodity feature library is established or updated using the following method:
   inputting an image of a commodity into the commodity recognizing model, which outputs commodity feature corresponding to the image of the commodity, wherein the image of the commodity has marked information of classification of the commodity and comprises at least one of images of existing commodities and images of new commodities; and
   storing the commodity feature corresponding to the image of the commodity output by the commodity recognizing model and the marked information of classification of the commodity in the commodity feature library.

5. The automatic vending method according to claim 1, further comprising:
   tracking a movement trajectory of the commodity picked up by the user according to a plurality of images of the commodity picked up by the user; and
   triggering an automatic settlement operation when a movement range of the commodity picked up by the user is beyond a specified area.

6. The automatic vending method according to claim 1, wherein a convolutional neural network model is used to position an image of a commodity picked up by a user from the image and recognize information of the commodity corresponding to the image of the commodity picked up by the user.

7. The automatic vending method according to claim 1, further comprising:
   determining a confidence degree of the possible combination of commodities according to a preset condition, wherein the preset condition comprises at least one of information of difference between a weight of the possible combination of commodities and the change value of load weight, or quantity of commodities in the possible combination of commodities,
   wherein recognizing information of the commodity corresponding to the image of the commodity picked up by the user comprises: recognizing information of the commodity corresponding to the image of the commodity picked up by the user according to the commodity feature library and in conjunction with the possible combination of commodities with a confidence degree higher than a preset value.

8. An automatic vending machine comprising:
   an automatic vending apparatus;
   a plurality of video stream capturing apparatuses alternately arranged on inner walls of two lateral surfaces of every two adjacent shelves in the automatic vending machine; and
   one or more weighing apparatuses each of which is set for each shelf in the automatic vending machine,
   wherein the automatic vending apparatus comprises:
      a memory; and
      a processor coupled to the memory, wherein the processor is configured to execute an automatic vending method based on instructions stored in the memory comprising:
      obtaining an image from a video stream of commodities in the automatic vending machine photographed by the plurality of video stream capturing apparatuses;
   positioning an image of a commodity picked up by a user from the image;
      obtaining a change value of load weight of a shelf where the commodity is picked up by the user;
      determining a possible combination of commodities corresponding to the change value of load weight according to a weight of each commodity in the automatic vending machine, wherein the possible combination of commodities comprises at least one possible commodity;
      recognizing information of the commodity corresponding to the image of the commodity picked up by the user according to a pre-established commodity feature library and in conjunction with the possible combination of commodities; and
      performing settlement automatically for the user according to the recognized information of the commodity.

* * * * *